United States Patent Office 3,319,823
Patented May 16, 1967

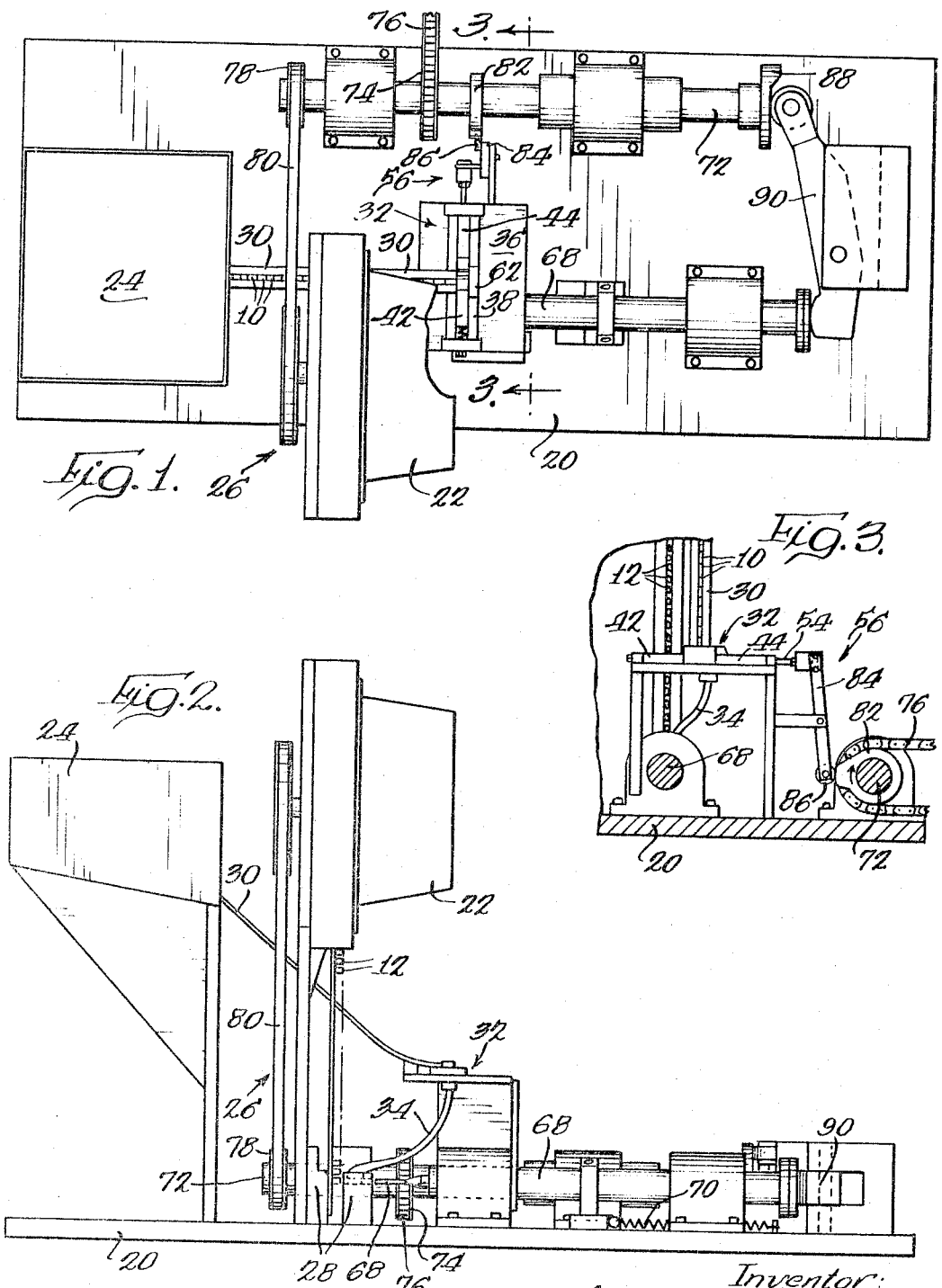

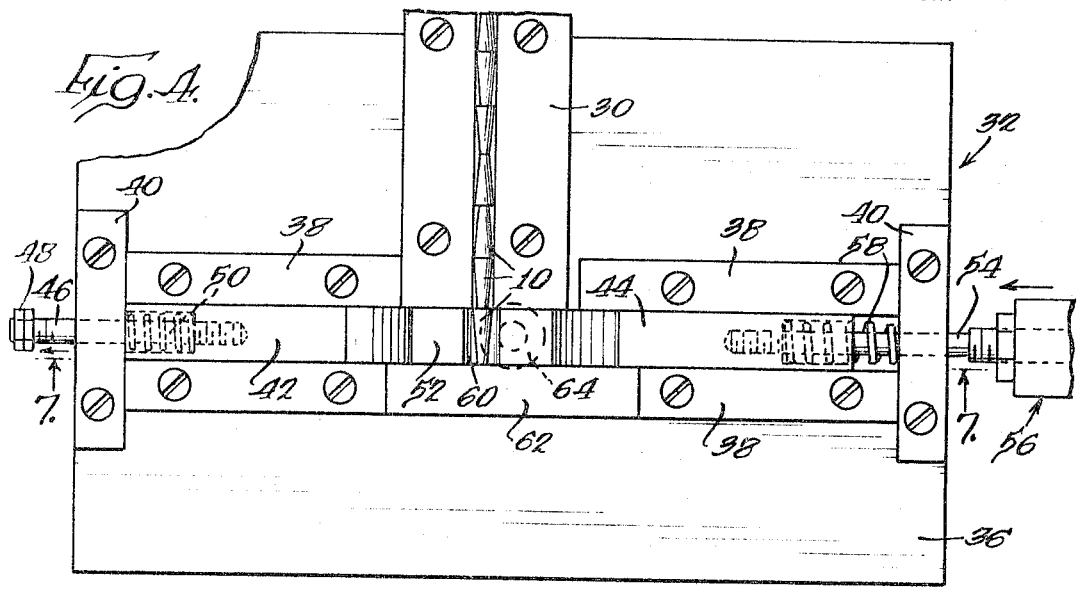
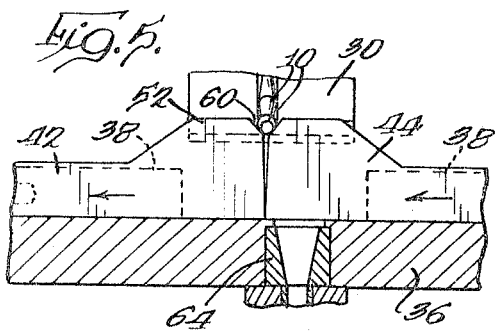
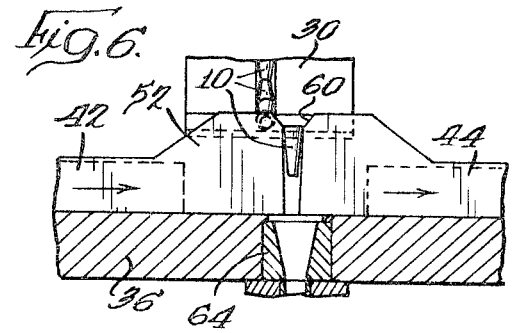
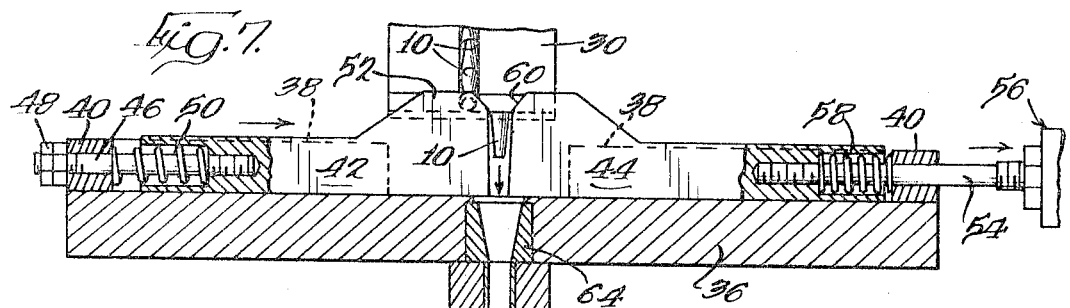
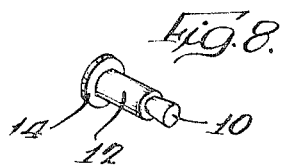

3,319,823
ORIENTATION OF TAPERED ELEMENTS
William O. Shineflug, Elmhurst, Ill., assignor to Chicago Rivet & Machine Co., Bellwood, Ill., a corporation of Illinois
Filed Nov. 17, 1965, Ser. No. 508,275
5 Claims. (Cl. 221—171)

The present invention relates to apparatus for properly orienting one component relative to another in a mass production assembly operation, and in particular, to the proper orientation of a tapered component relative to a complemental hollow component and assembly of the two.

In order to acquaint those skilled in the art with the manner of making and using the apparatus of the invention, there is described hereinafter, in connection with the accompanying drawings, the best mode presently contemplated for carrying out the invention.

In the drawings:

FIGURE 1 is a plan view of the preferred embodiment of the apparatus of the invention;

FIGURE 2 is a side elevation thereof;

FIGURE 3 is a fragmentary cross-sectional view taken on line 3—3 of FIGURE 1;

FIGURE 4 is a plan view, on an enlarged scale, of the tapered plug orienting means of the invention;

FIGURE 5 is fragmentary longitudinal section of the plug orienting means in plug receiving position;

FIGURE 6 is a view similar to FIGURE 5 showing the plug orienting means in plug orienting position;

FIGURE 7 is a longitudinal section of the plug orienting means taken on line 7—7 of FIGURE 4 and showing the same in plug releasing position; and FIGURE 8 is a perspective view of the product produced by the illustrated embodiment of the invention.

Referring first to FIGURE 8, the specific object of the illustrated embodiment of the apparatus of the invention is the assembly of a tapered plug 10 of wear resistant material, such as tungsten carbide, in a tubular radially flanged rivet body 12. The resultant product has use, by way of example, as a traction increasing reinforcing stud for the treads of automotive and truck tires. Specifically, by imbedding a plurality of the studs in a tire with the flange or head 14 of each stud below or near the base of the tread and the plug 10 at the face of the tread, the wear resistance and traction of the tire, especially on ice and snow, are significantly increased.

According to the present invention, a tapered plug 10 is oriented and assembled with a rivet 12 entirely automatically and at mass production rates by the apparatus illustrated in FIGURES 1 to 7.

The apparatus comprises a base or frame 20 supporting in elevated position a supply hopper 22 for the rivets 12 and a supply hopper 24 for the tapered plugs 10. The hopper 22 has associated therewith means indicated generally at 26 for orienting the rivets in a horizontal position with their heads or flanges to the left, as viewed in FIGURE 2, and for feeding the rivets in a vertical stream one by one to an assembly die 28. The hopper 24 also has means therein (not shown) for feeding the tapered plugs in end to end relation to an inclined feed chute 30. Such orienting and feeding means are known per se in the art.

The chute 30 receives the plugs 10 in end to end relation, but not with discrimination as to which end is first, and feeds them seriatim to the orienting means 32 of the invention, which functions to rearrange the plugs so that they are fed small end first via the tube or chute 34 into axial alignment with respective rivets 12 in the die 28.

The orienting means 32, as shown in FIGURES 4 to 7, comprises a base plate or frame 36 adjustably mounting thereon spaced parallel slide guides 38 and a pair of transverse slide supports 40. The plug chute 30 leads to an intermediate point along the length of the guides, adjacent the upper surfaces thereof. Slidably mounted between the guides 38 are a pair of plug orienting slide members 42 and 44, the combined length of which is less than the distance between the supports 40.

The left hand slide 42, as viewed in FIGURES 4 to 7, is a generally rectangular block fitting between the guides 38 and including a threaded stem 46 extending slidably through the left hand support 40. Adjusting nuts 48 are threaded on the outer end of the stem 46 and a compression spring 50 is confined between the left hand support 40 and the slide 42 normally to bias the latter to the right to the extent accommodated by the nuts 48. At its upper surface, the slide includes an elevated portion 52 defining a face opposed to the feed chute or slot 30 for closing the latter when the block is moved to the right by the spring 50, as shown in FIGURES 6 and 7.

The right hand slide 44 is substantially identical to, but faces oppositely of the slide 42 and the stem 54 thereof extends slidably through the right hand support 40 to an operating mechanism indicated generally at 56. A compression spring 58 stronger than the spring 50 acts upon the slide 44 normally to bias it and the slide 42 to the left, as shown in FIGURES 4 and 5, to the limit accommodated by the left support 40.

With the slides 42 and 44 positioned as shown in FIGURES 4 and 5, the juncture between or the mating faces of the two slides are aligned with the lower end of the feed chute 30 so as to receive a plug therefrom. The two slides have tapered top edges defining a recess 60 for reception of the plug and the guide 38 opposite the chute includes an elevated portion 62 limiting feed to the recess to a single plug at a time.

At a predetermined time in the cycle of the machine, the mechanism 56 operates to pull the slide 44 to the right, whereupon the spring 50 causes the slide 42 to follow the slide 44 until the portion 52 of slide 42 blocks the feed chute 30. Thereafter, the nuts 48 engage the left hand support 40 and stop the slide 42 in a position wherein the face thereof, and thus the recess 60, is aligned with the delivery chute 34. The mechanism 56 continues to pull the slide 44 to the right at a controlled rate of speed or in controlled steps so that a space is gradually opened up between the mating faces of the two slides. As this space gradually or graduatedly increases in width, the small end of the frusto-conical or tapered plug 10 gravitates downwardly into the space while the larger end thereof is held at the recess 60 since the space is not large enough to accommodate passage of such end. Thus, the plug 10 assumes the vertical position shown in FIGURE 6 with its small end facing down. Immediately thereafter, the slide 44 separates a further increment from the slide 42, whereupon the plug is dropped vertically downwardly as indicated in FIGURE 7, into the delivery chute 34.

The chute 34 is preferably comprised of a tapered hole defined by an insert 64 in the base plate 36, the hole being sufficiently large to receive the plug from any point across the width of the slides 42—44 and yet sufficiently small to maintain the small-end-down orientation of the plug, and a tube 66 leading from the insert 64 to the die 28. The slides 42 and 44 preferably move transversely of the chutes 30 and 34 so that the feed chute 30 may extend over the delivery chute 34 at an opposite inclination (see FIGURE 2) to maintain the machine as compact as possible and yet take advantage of the forces of gravity for feed and orientation purposes. The plugs 10 are thus fed one at a time into the die 28 with the small end thereof aligned with and facing the open or unflanged end of the respective rivet 12.

To press the plug into the rivet, the apparatus includes a reciprocable plunger 68 aligned with and enterable into the die 28 from the plug receiving end thereof. The plunger is preferably mechanically driven into the die to force the plug into the rivet, and is returned by a spring 70 to a normal retracted position as shown in FIGURE 2.

To correlate the feed of the plugs 10 and the operation of the assembly plunger 68, the orienting means 32 and the plunger are preferably operated in controlled sequence from a common cam shaft 72 adapted to be rotated by a sprocket 74 and a chain or belt 76 from a suitable source of power. The shaft 72 may also be used to drive the rivet orienting means 26, as by means of sprocket 78 and belt 80, to correlate the entire machine operation.

The plug orienting means 32, specifically the slide 44 thereof, is actuated by a cam 82 secured to the shaft 72 and acting upon a cam follower 84 in the form of a lever of the first class. The lever is pivotally mounted on the machine frame intermediate its ends, is physically coupled at one end thereof to the stem 54 of the slide 44, and is provided at the other end thereof with a roller 86 biased into engagement with the cam by the slide spring 58, whereby the lever 84 and slide 44 are compelled to follow the slide actuating surface of the lobe on the cam 82.

The plug assembling plunger 68 is actuated by a second cam 88 secured to the shaft 72 with the lobe thereof spaced circumferentially from the lobe of cam 82. This cam also operates through a follower 90 in the form of a first class lever operable to drive the plunger to the left as shown in FIGURES 1 and 2. Due to the circumferential offsetting of the lobes of the two cams, the same will operate, first, to orient and deliver a plug and a rivet to the die 28, second, move the plunger 68 to the left to press the plug into the rivet, third, remove the product from the die (either by the plunger or the rivet orienting means 26) and fourth, retract the plunger from the die before another rivet and plug are fed thereto.

Thus, the invention provides apparatus for orienting tapered plugs and for assembling such tapered plugs in hollow bodies, in a most economical and practical manner consistent with modern high speed mass production practices.

While a preferred embodiment of the invention has been shown and described herein, it is to be appreciated that various changes, rearrangements and modifications may be made therein without departing from the scope of the present invention, as defined by the appended claims.

What is claimed is:

1. Apparatus for orienting and conveying tapered plugs or the like comprising, in combination, a pair of first and second slide members disposed in end-to-end relation and slidable along a common path, said members being slidable into and out of engagement with one another and defining a plug-receiving recess adjacent the juncture thereof when engaged with one another, first delivery means disposed generally above said slide members for delivering randomly oriented plugs one at a time to said recess when said slide members are in a plug-receiving position, second delivery means disposed beneath said slide members and offset along the length of said path from said first delivery means for receiving a plug released small end first by said slide members, said first slide member having a blocking portion thereon for blocking said first delivery means when said first slide is moved in overlying relation thereto, and actuating means for (1) moving said slide members into a plug-receiving position with said slides in engagement with one another and said recess disposed in alignment with said first delivery means so as to receive a plug therefrom, (2) moving said engaged slide members along said path so as to align said recess with said second delivery means while moving said first slide member into blocking relation with said first delivery means, and (3) separating said slide members at a controlled rate of speed so as to release said plug small end first into said second delivery means.

2. The invention of claim 1 including yieldable means for biasing said first slide member toward said second slide member whereby upon movement of said second slide member from a position of alignment with said first delivery means to a position of alignment with said second delivery means, said first slide member will be caused by said yieldable means to follow said second slide member.

3. The invention of claim 2 including stop means for stopping said first slide member when said recess is aligned with said second delivery means whereby upon further movement of said second slide member by said actuating means said second slide member will be separated from said first slide member so as to release said plug small end first into said second delivery means.

4. The invention of claim 2 where subsequent to release of a plug into said second delivery means said actuating means moves said second slide member back into a plug-receiving position in alignment with said first delivery means and said second slide member engages said first slide member and pushes the latter into said plug-receiving position against the force of said yieldable means.

5. Apparatus for orienting and conveying tapered plugs or the like comprising, in combination, a pair of first and second slide members disposed in end-to-end relation and slidable along a common path, said slide members being slidable into and out of engagement with one another and defining a plug-receiving recess adjacent the juncture thereof when engaged with one another, first delivery means disposed generally above said slide members for delivering randomly oriented plugs one at a time to said recess when said slide members are in a plug-receiving position, second delivery means disposed beneath said slide members and offset along the length of said path from said first delivery means for receiving a plug released small end first by said slide members, said first slide member having a blocking portion thereon for blocking said first delivery means when said first slide member is moved in overlying relation thereto, and actuating means for (1) moving said slide members into a plug-receiving position with said slide members in engagement with one another and said recess disposed in alignment with said first delivery means so as to receive a plug therefrom, (2) moving said engaged slide members along said path so as to align said recess with said second delivery means while moving said first slide member into blocking relation with said first delivery means, (3) separating said slide members at a controlled rate of speed so as to release said plug small end first into said second delivery means, and (4) returning said slide members to said plug-receiving position, said actuating means including first yieldable means urging said first slide member toward said second slide member in the direction of said second delivery means, stop means for stopping said first slide member when the end thereof is aligned with said second delivery means, second yieldable means urging said second slide member toward said first slide member in the direction of said first delivery means, said second yieldable means producing a greater force than said first yieldable means and means for moving said second slide member against the force of said second yieldable means so as to move the end of said second slide member from said first delivery means to said second delivery means at which time said first yieldable means will cause said first slide member to follow said second slide member until stopped by said stop means, after which said second slide member will be separated from said first slide member to release said plug into said second delivery means.

References Cited by the Examiner

UNITED STATES PATENTS

| 1,287,669 | 12/1918 | Gillette | 221—172 X |
| 1,993,716 | 3/1935 | Hanley et al. | 221—172 X |
| 2,073,964 | 3/1937 | Foss | 221—171 X |

FOREIGN PATENTS

| 328,849 | 8/1935 | Italy. |

SAMUEL F. COLEMAN, *Primary Examiner.*